United States Patent
Asai et al.

(10) Patent No.: US 11,991,206 B2
(45) Date of Patent: May 21, 2024

(54) INSTALLATION LOCATION SELECTION ASSISTANCE APPARATUS, INSTALLATION LOCATION SELECTION ASSISTANCE METHOD, AND COMPUTER READABLE MEDIUM

(71) Applicant: MITSUBISHI ELECTRIC CORPORATION, Tokyo (JP)

(72) Inventors: Takeshi Asai, Tokyo (JP); Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 863 days.

(21) Appl. No.: 17/039,293

(22) Filed: Sep. 30, 2020

(65) Prior Publication Data
US 2021/0168170 A1    Jun. 3, 2021

Related U.S. Application Data

(63) Continuation of application No. PCT/JP2018/019665, filed on May 22, 2018.

(51) Int. Cl.
*H04L 9/40* (2022.01)

(52) U.S. Cl.
CPC ...... *H04L 63/1466* (2013.01); *H04L 63/1416* (2013.01); *H04L 63/1425* (2013.01); *H04L 63/20* (2013.01)

(58) Field of Classification Search
CPC ............. H04L 63/1466; H04L 63/1416; H04L 63/1425; H04L 63/20; H04L 63/1408;
(Continued)

(56) References Cited

U.S. PATENT DOCUMENTS 7,966,659 B1 * 6/2011 Wilkinson .......... H04L 63/0209
726/25
2002/0157015 A1    10/2002 Gilbert et al.
(Continued)

FOREIGN PATENT DOCUMENTS

| CN | 107104960 A | 8/2017 |
| JP | 2002-351661 A | 12/2002 |

(Continued)

OTHER PUBLICATIONS

Chen et al., "Optimising IDS Sensor Placement", 2010, pp. 315-320 (Year: 2010).*
(Continued)

*Primary Examiner* — Thaddeus J Plecha
(74) *Attorney, Agent, or Firm* — BIRCH, STEWART, KOLASCH & BIRCH, LLP (57) ABSTRACT

A combination identification unit (27) identifies combinations of one or more components which constitute a target system and in each of which an intrusion detection system that detects unauthorized access can be installed. A combination reduction unit (28) extracts, from the combinations identified by the combination identification unit, a combination that satisfies an installation condition accepted by an installation condition input unit (22) and can detect unauthorized communications indicated by attack information accepted by an attack information input unit (24) at a rate higher than or equal to a threshold.

11 Claims, 12 Drawing Sheets

(58) Field of Classification Search
CPC ... H04L 63/1441; G06F 21/55; H04W 12/121
See application file for complete search history.

(56) References Cited

U.S. PATENT DOCUMENTS

| | | | |
|---|---|---|---|
| 2004/0193892 | A1 | 9/2004 | Tamura et al. |
| 2004/0215978 | A1 | 10/2004 | Okajo et al. |
| 2005/0039047 | A1* | 2/2005 | Raikar ............... H04L 63/1408 726/4 |
| 2007/0056020 | A1 | 3/2007 | Ward |
| 2007/0266437 | A1 | 11/2007 | Gilbert et al. |
| 2010/0058456 | A1 | 3/2010 | Jajodia et al. |
| 2010/0082513 | A1* | 4/2010 | Liu ..................... H04L 63/1458 706/46 |
| 2014/0337977 | A1 | 11/2014 | Ward |
| 2017/0230413 | A1 | 8/2017 | Maresca |
| 2018/0114421 | A1 | 4/2018 | Siminoff |
| 2019/0166009 | A1* | 5/2019 | Parvin ................ H04L 41/0803 |

FOREIGN PATENT DOCUMENTS

| | | |
|---|---|---|
| JP | 2003-92603 A | 3/2003 |
| JP | 2003-174483 A | 6/2003 |
| JP | 2004-302956 A | 10/2004 |
| JP | 2004-342072 A | 12/2004 |
| JP | 3649180 B2 | 5/2005 |
| JP | 2009-507454 A | 2/2009 |
| JP | 4222184 B2 | 2/2009 |
| JP | 2010-33100 A | 2/2010 |
| JP | 2010-33596 A | 2/2010 |
| JP | 4520703 B2 | 8/2010 |
| JP | 4649080 B2 | 3/2011 |
| JP | 4743911 B2 | 8/2011 |
| JP | 4814988 B2 | 11/2011 |
| JP | 6253862 B1 | 12/2017 |
| WO | WO 2008/050651 A1 | 5/2008 |
| WO | WO 2018/134909 A1 | 7/2018 |

OTHER PUBLICATIONS

International Search Report, issued in PCT/JP2018/019665, PCT/ISA/210, dated Jul. 17, 2018.
Chinese Office Action and Search Report for Chinese Application No. 201880093477.5, dated Oct. 23, 2023, with English translation.
Chinese Office Action for Chinese Application No. 201880093477.5, dated Mar. 6, 2024, with English translation.

* cited by examiner

| No. | NUMBER OF POSSIBLE INSTALLATION LOCATIONS (i) | COMBINATION OF POSSIBLE INSTALLATION LOCATIONS (CONSTITUENT NODE NUMBERS) |
|---|---|---|
| 1 | 1 | 1 |
| 2 | 1 | 2 |
| ... | ... | ... |
| 7 | 1 | 7 |
| 8 | 2 | 1, 2 |
| ... | ... | ... |

Fig.7

| NODE POSITION (ATTACK TREE NODE NUMBER) | ACTIVITY CONTENT | | CATEGORY |
|---|---|---|---|
| | TYPE | DETAILS | |
| 1 | ATTACK GOAL | STEAL CONFIDENTIAL FILE ON SERVER MACHINE | – |
| 1.1 | ATTACK METHOD | PERFORM REMOTE EXPLOIT ON SERVER MACHINE FROM MACHINE 1 VIA CHANNEL 1 | UNAUTHORIZED COMMUNICATION |
| 1.1.1 | OR GATE | – | – |
| ⋮ | ⋮ | ⋮ | ⋮ |

| No. | NUMBER OF INSTALLATION LOCATIONS (NUMBER OF NON-ZERO ELEMENTS IN $\vec{x}$) | INSTALLATION LOCATION (EACH ELEMENT OF $\vec{x}$) | COVERAGE [%] | NUMBER OF EACH DETECTABLE UNAUTHORIZED COMMUNICATION (COVER PLACE) (EACH ELEMENT OF $\vec{d}$) |
|---|---|---|---|---|
| 1 | 1 | 1 | 25 | 7, 8 |
| 2 | 1 | 2 | 50 | 4, 5, 7, 8 |
| ... | ... | ... | ... | ... |
| 7 | 1 | 7 | 25 | 1, 2 |
| 8 | 2 | 1, 2 | 50 | 4, 5, 7, 8 |
| ... | ... | ... | ... | ... |

Fig. 10

| DETECTION SYSTEM NUMBER | COST | THROUGHPUT | ... |
|---|---|---|---|
| 1 | xxx1 | yyy1 | ... |
| 2 | xxx2 | yyy2 | ... |
| ... | ... | ... | ... |

Fig.11

(FORMULA 1) $\min. \quad \sum_i \left( \sum_j r_j^h + \sum_j r_j^n \right)$ (FORMULA 2) $\min. \quad \sum_i \left( \sum_j m_{r_j^h} r_j^h + \sum_j m_{r_j^n} r_j^n \right)$ (FORMULA 3) $\max. \quad \sum_i \left( \sum_j T_{Pr_j^h} r_j^h - T_{Rx_i} \right)$ (FORMULA 4) IN EACH $i$, $\max. \quad \sum_j T_{Pr_j^h} r_j^h - T_{Rx_i}$ (ALSO APPLIES TO $n$ INSTEAD OF $h$)

$r_j^h$ : NUMBER OF HIDS TO BE INSTALLED IN GIVEN $x_i$ ($j$ IS ID OF IDS) (NORMALLY 0 or 1)

$r_j^n$ : NUMBER OF NIDS TO BE INSTALLED IN GIVEN $x_i$ ($j$ IS ID OF IDS)

$m_{r_j^h}$ : COST OF $r_j^h$ $m_{r_j^n}$ : COST OF $r_j^n$ $T_{Pr_j^h}$ : THROUGHPUT OF GIVEN IDS (NUMBER OF SYSTEMS: $r_j^h$) (DEFINITION ALSO APPLES TO NIDS)

$T_{Rx_i}$ : MAXIMUM VALUE OF EXPECTED TRAFFICE VOLUME IN GIVEN $x_i$

INSTALLATION LOCATION SELECTION ASSISTANCE APPARATUS, INSTALLATION LOCATION SELECTION ASSISTANCE METHOD, AND COMPUTER READABLE MEDIUM

CROSS REFERENCE TO RELATED APPLICATIONS

This application is a Continuation of PCT International Application No. PCT/JP2018/019665 filed on May 22, 2018, which is hereby expressly incorporated by reference into the present application.

TECHNICAL FIELD

The present invention relates to a technology to assist selection of an installation location of an intrusion detection system (IDS) that detects unauthorized access.

BACKGROUND ART

In the development of information technology (IT) systems, it is essential to identify threats by conducting security analysis, clarify necessary security countermeasures, and then implement or introduce appropriate security countermeasures.

In order to perform this work, an analyst with a high level of security expertise is required. This work will take a lot of time even when performed by the analyst with a high level of security expertise.

Patent Literature 1 describes allowing an optimal combination of countermeasure candidates to be selected for each combination of attack activities to be dealt with, according to actual attack situations.

CITATION LIST

Patent Literature

Patent Literature 1: JP 6253862 B

SUMMARY OF INVENTION

Technical Problem

By using the technology described in Patent Literature 1, it is possible to determine a combination of security countermeasures appropriate for each business operator. However, there are security countermeasures that require more detailed determinations. Specifically, when a security countermeasure of "to introduce an intrusion detection system" is adopted, a location where an intrusion detection system is to be installed will remain arbitrary with only "to introduce an intrusion detection system".

It is an object of the present invention to assist selection of an installation location of an intrusion detection system.

Solution to Problem

An installation location selection assistance apparatus according to the present invention includes:

a combination identification unit to identify combinations of one or more components which constitute a target system and in each of which an intrusion detection system that detects unauthorized access can be installed; and a combination reduction unit to extract, from the combinations identified by the combination identification unit, a combination that can detect an unauthorized communication indicated by attack information.

Advantageous Effects of Invention

In the present invention, combinations of components in each of which an intrusion detection system can be installed are identified, and combinations that can detect an unauthorized communication are extracted. This limits locations where an intrusion detection system is to be installed. Therefore, selection of a location where an intrusion detection system is to be installed is facilitated.

DESCRIPTION OF EMBODIMENTS

First Embodiment

Description of Configuration

Figure 1:
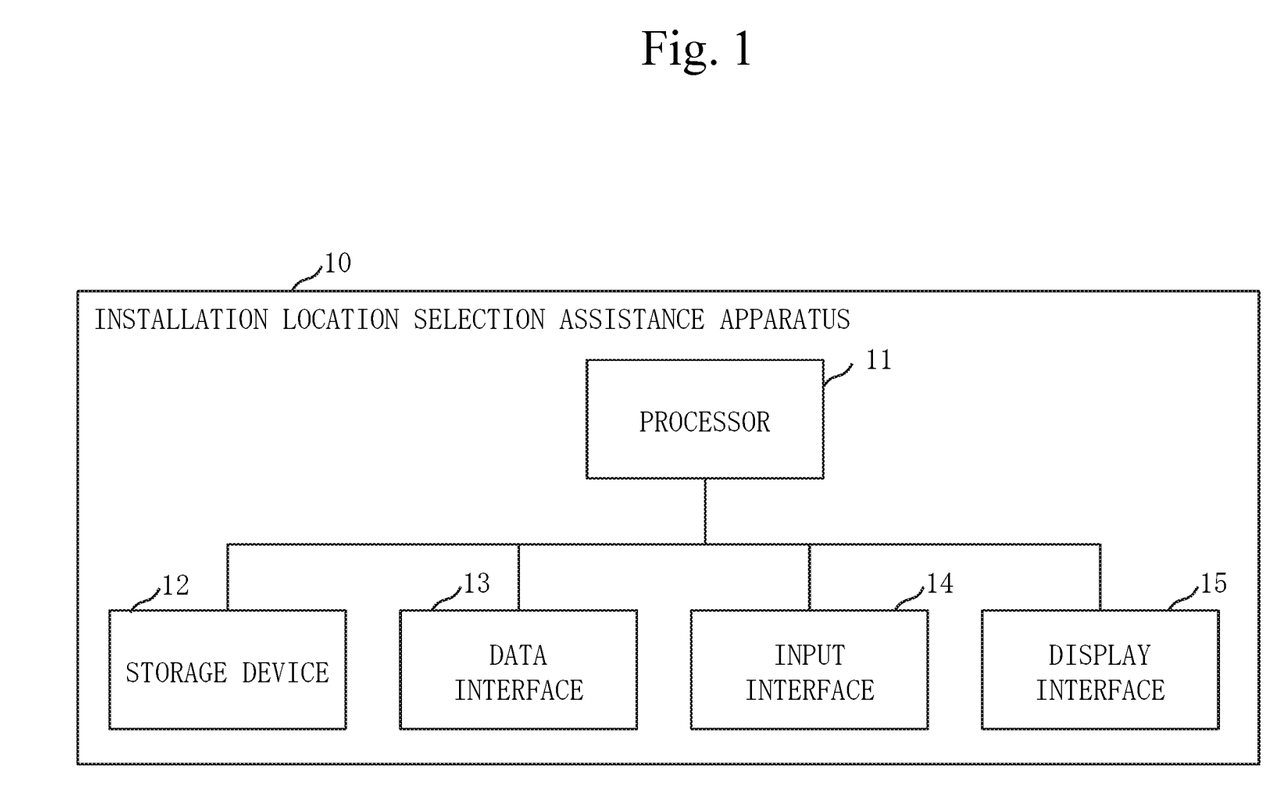
FIG. 1 is a hardware configuration diagram of an installation location selection assistance apparatus 10 according to a first embodiment.

Referring to FIG. 1, a hardware configuration of an installation location selection assistance apparatus 10 according to a first embodiment will be described.

The installation location selection assistance apparatus 10 is a computer.

The installation location selection assistance apparatus 10 includes hardware of a processor 11, a storage device 12, a data interface 13, an input interface 14, and a display interface 15. The processor 11 is connected with the other hardware components via signal lines and controls the other hardware components.

The processor 11 is an integrated circuit (IC) that performs processing. Specific examples of the processor 11 are a central processing unit (CPU), a digital signal processor (DSP), and a graphics processing unit (GPU).

The storage device 12 is a storage device to store data. A specific example of the storage device 12 is a hard disk drive (HDD). Alternatively, the storage device 12 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

The data interface 13 is an interface for inputting data from and outputting data to external devices. A specific example of the data interface 13 is an Ethernet (registered trademark) port.

The input interface 14 is a device for connecting an input device to be operated by a user. A specific example of the input interface 14 is a Universal Serial Bus (USB) port.

The display interface 15 is a device for connecting a display device. A specific example of the display interface 15 is a High-Definition Multimedia Interface (HDMI, registered trademark) port.

Figure 2:
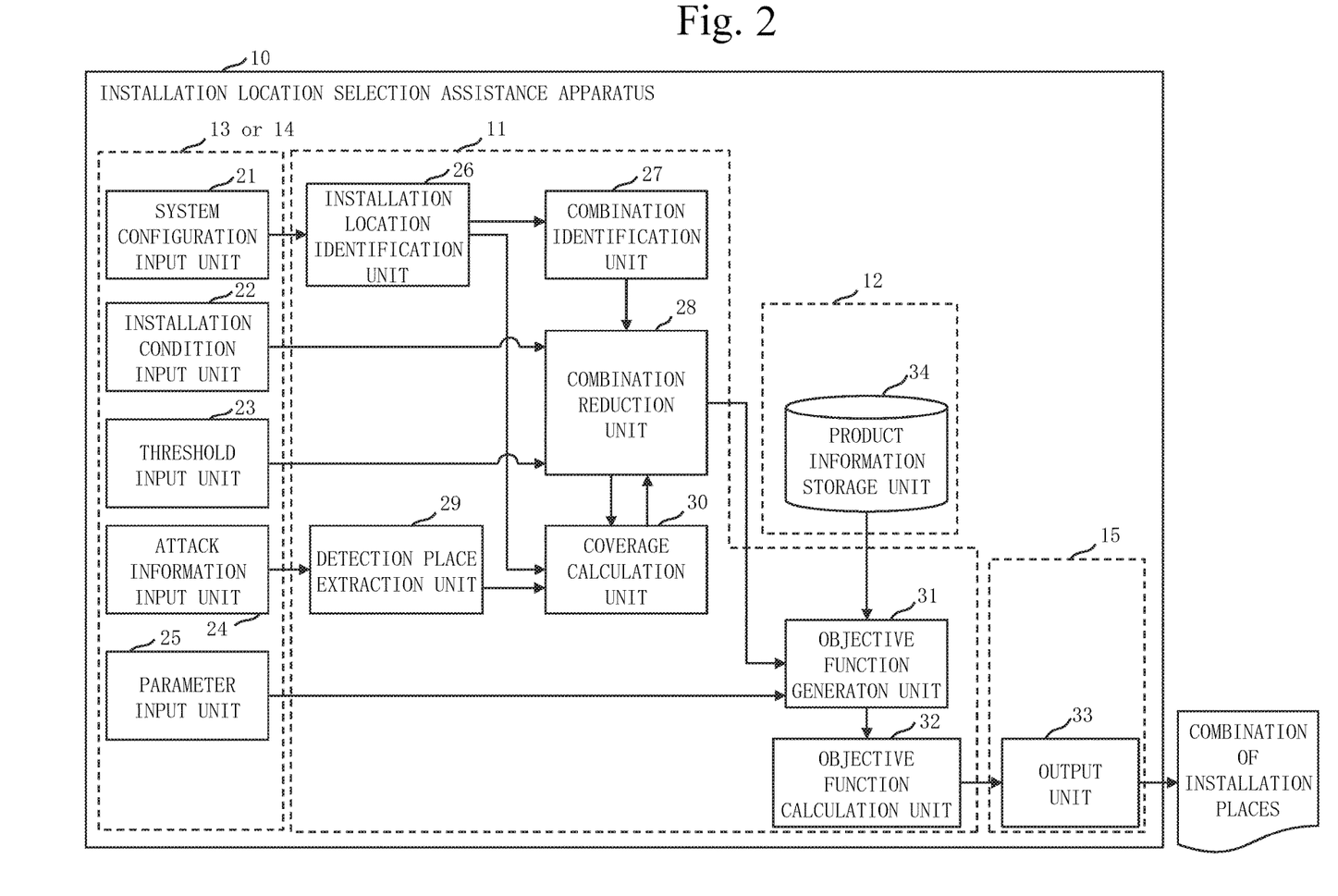
FIG. 2 is a functional configuration diagram of the installation location selection assistance apparatus 10 according to the first embodiment.

Referring to FIG. 2, a functional configuration of the installation location selection assistance apparatus 10 according to the first embodiment will be described.

The installation location selection assistance apparatus 10 includes, as functional components, a system configuration input unit 21, an installation condition input unit 22, a threshold input unit 23, an attack information input unit 24, a parameter input unit 25, an installation location identification unit 26, a combination identification unit 27, a combination reduction unit 28, a detection place identification unit 29, a coverage calculation unit 30, an objective function generation unit 31, an objective function calculation unit 32, an output unit 33, and a product information storage unit 34.

The functions of the system configuration input unit 21, the installation condition input unit 22, the threshold input unit 23, the attack information input unit 24, and the parameter input unit 25 are realized by at least one of the data interface 13 and the input interface 14. The functions of the installation location identification unit 26, the combination identification unit 27, the combination reduction unit 28, the detection place identification unit 29, the coverage calculation unit 30, the objective function generation unit 31, and the objective function calculation unit 32 are realized by the processor 11. The function of the output unit 33 is realized by the display interface 15. The function of the product information storage unit 34 is realized by the storage device 12.

The functions of the functional components of the installation location identification unit 26, the combination identification unit 27, the combination reduction unit 28, the detection place identification unit 29, the coverage calculation unit 30, the objective function generation unit 31, and the objective function calculation unit 32 are realized by software. The storage device 12 stores programs for realizing the functions of these functional components. These programs are read by the processor 11 and executed by the processor 11. This realizes the functions of these functional components.

FIG. 1 illustrates only one processor 11. However, a plurality of processors 11 may be included, and the plurality of processors 11 may cooperate to execute the programs for realizing the functions.

Description of Operation

Referring to FIGS. 3 to 10, operation of the installation location selection assistance apparatus 10 according to the first embodiment will be described.

The operation of the installation location selection assistance apparatus 10 according to the first embodiment corresponds to an installation location selection assistance method according to the first embodiment. The operation of the installation location selection assistance apparatus 10 according to the first embodiment also corresponds to processes of an installation location selection assistance program according to the first embodiment.

Figure 3:
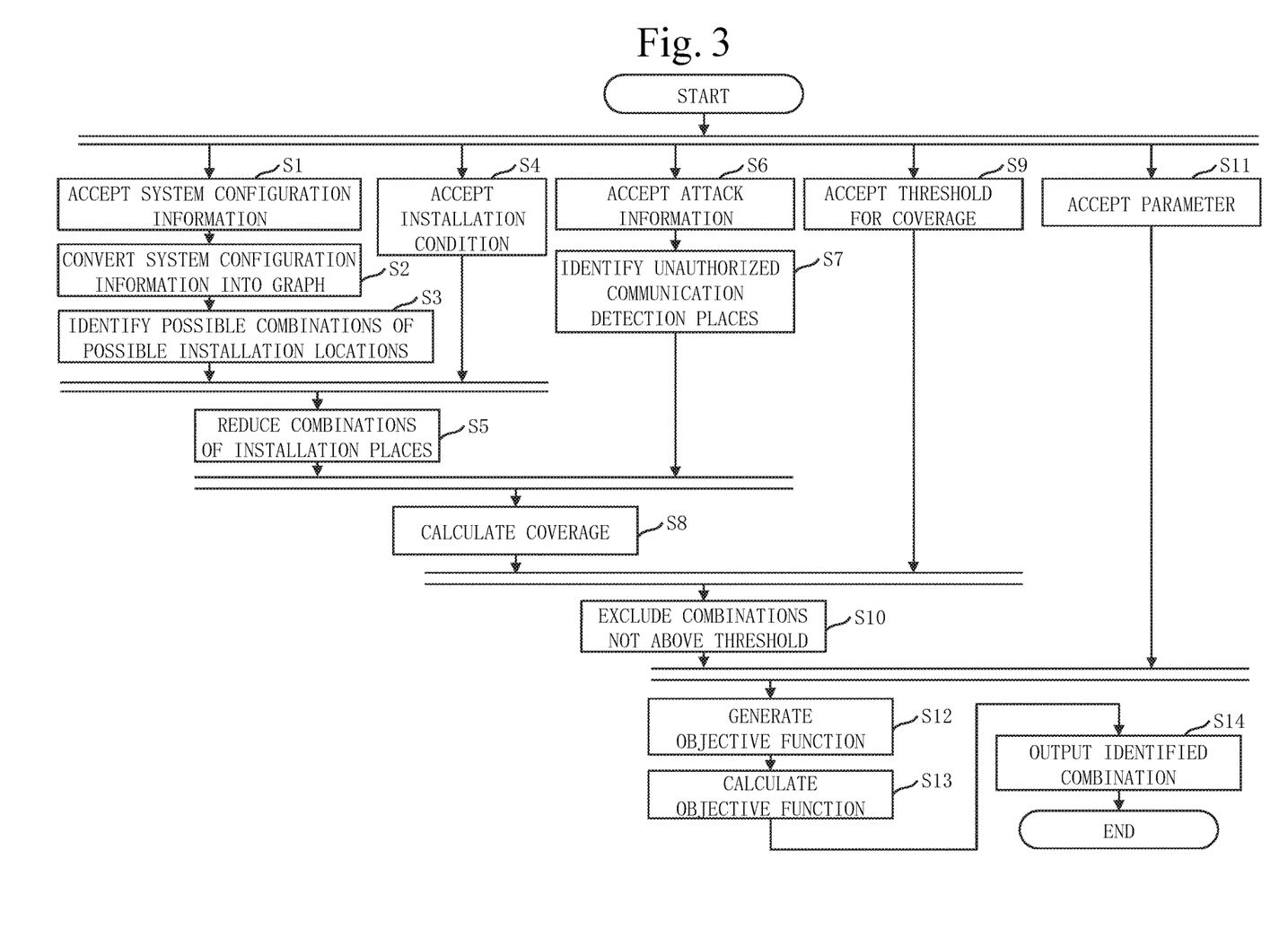
FIG. 3 is a flowchart illustrating operation of the installation location selection assistance apparatus 10 according to the first embodiment.

(Step S1 of FIG. 3: System Configuration Input Process)

The system configuration input unit 21 accepts input of system configuration information of a target system 50 in which an intrusion detection system is to be installed.

Specifically, the system configuration information of the target system 50 is created by a user. The system configuration input unit 21 acquires the created system configuration information. The system configuration input unit 21 writes the acquired system configuration information in the storage device 12.

Figure 4:
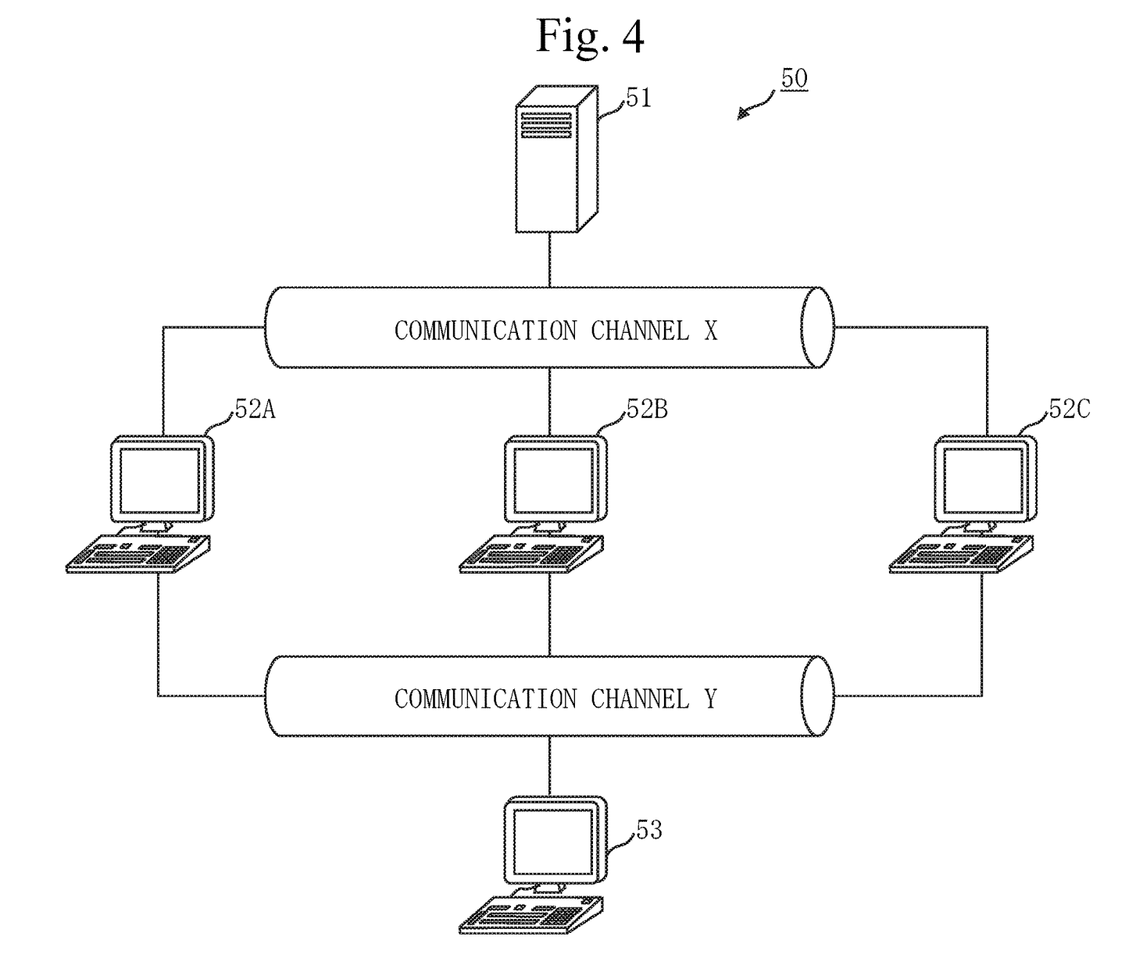
FIG. 4 is a diagram illustrating an example of system configuration information according to the first embodiment.

As illustrated in FIG. 4, a specific example of the system configuration information is drawing data created by existing drawing software such as Microsoft Visio (registered trademark). In FIG. 4, the target system 50 includes, as components, a server 51, three computers 52A to 52C, a guest terminal 53, and communication channels X and Y. In the target system 50, the server 51 and each of the computers 52A to 52C are connected via the communication channel X, and each of the computers 52A to 52C and the guest terminal 53 are connected via the communication channel Y.

The system configuration information may be data in other formats, such as data that represents the system configuration in the DOT language for expressing a graph using plain text.

(Step S2 of FIG. 3: Installation Location Identification Process)

The installation location identification unit 26 converts the system configuration information accepted in step S1 into a graph.

Specifically, the installation location identification unit 26 retrieves the system configuration information from the storage device 12. The installation location identification unit 26 converts the system configuration information into a graph by treating the components of the target system 50 indicated by the system configuration information as nodes (hereinafter referred to as constituent nodes) and expressing a connection between each pair of constituent nodes as an edge. Then, the installation location identification unit 26 extracts each constituent node in the graph resulting from conversion as a location where an intrusion detection system can be installed, and assigns a constituent node number, which is an identifier, to each constituent node. The installation location identification unit 26 writes the graph in which constituent node numbers are assigned to the constituent nodes in the storage device 12.

Figure 5:
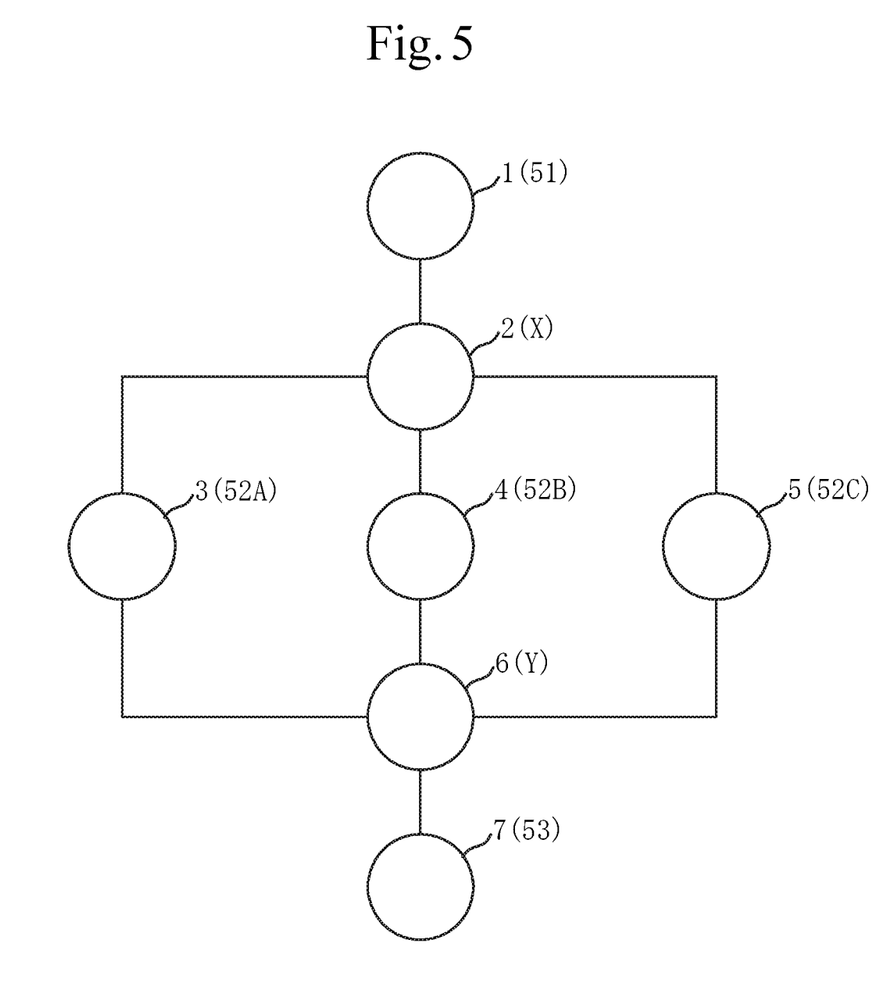
FIG. 5 is a diagram illustrating a graph converted from the system configuration information illustrated in FIG. 4.

In the case of the system configuration information illustrated in FIG. 4, the server 51, the three computers 52A to 52C, the guest terminal 53, the communication channel X, and the communication channel Y, which are the components of the target system 50, are expressed as constituent nodes, as illustrated in FIG. 5. Then, edges are provided so that the server 51 and each of the computers 52A to 52C are connected via the communication channel X, and each of the computers 52A to 52C and the guest terminal 53 are connected via the communication channel Y. In FIG. 5, a node number "1" is assigned to the server 51, a node number "2" is assigned to the communication channel X, a node number "3" is assigned to the computer 52A, a node number "4" is assigned to the computer 52B, a node number "5" is assigned to the computer 52C, a node number "6" is assigned to the communication channel Y, and a node number "7" is assigned to the guest terminal 53.

(Step S3 of FIG. 3: Combination Identification Process)

The combination identification unit 27 identifies combinations of one or more components which constitute the target system 50 and in each of which an intrusion detection system can be installed.

Specifically, it is assumed that the target system 50 includes n components, where n is an integer of 1 or greater. The combination identification unit 27 identifies all combinations of components for each integer i of i=1, n. The combination identification unit 27 writes the identified combinations in the storage device 12.

Figure 6:
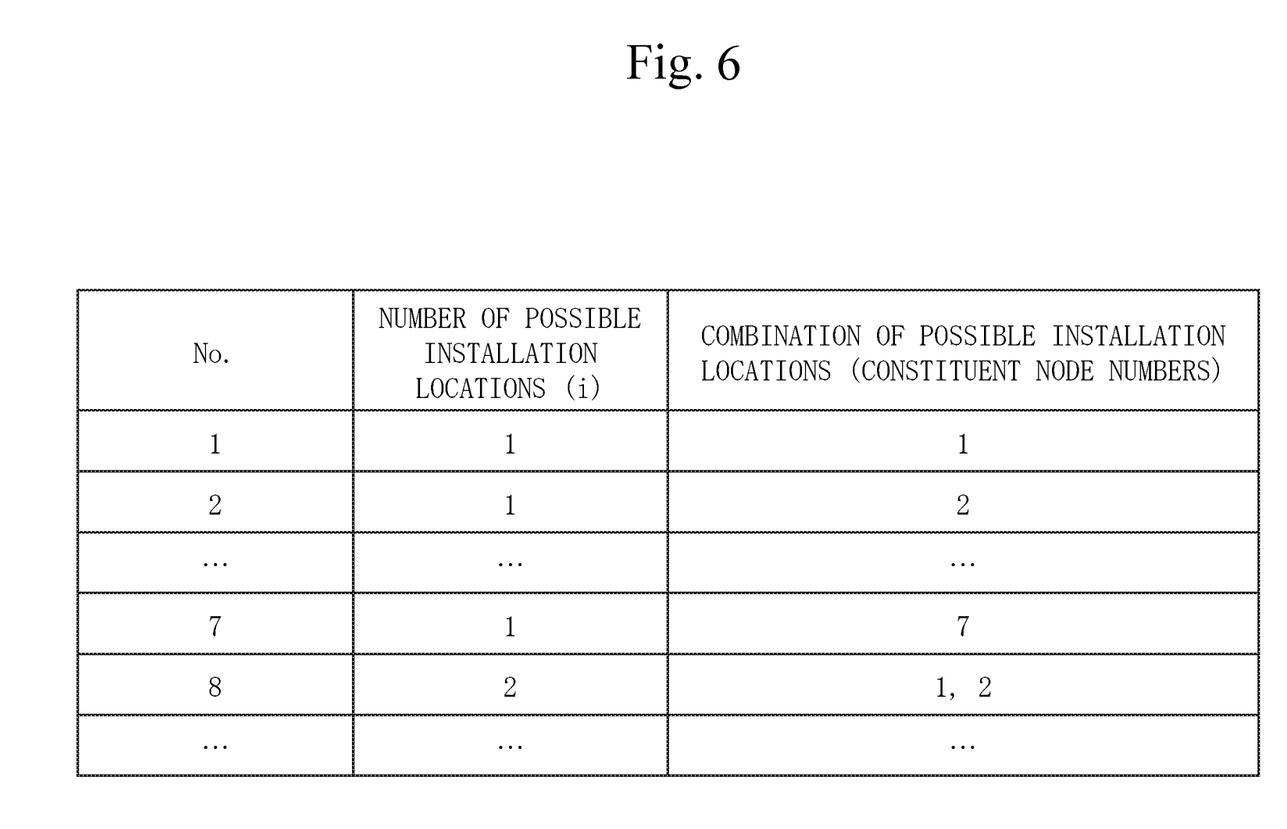
FIG. 6 is a diagram illustrating combinations identified from the system configuration information illustrated in FIG. 5.

In the case of the target system 50 illustrated in FIG. 5, n is 7. As illustrated in FIG. 6, in the case of the target system 50 illustrated in FIG. 5, combinations of i constituent node(s) out of the constituent node number "1" to the constituent node number "7" are identified for each integer i of i=1, . . . , 7.

(Step S4 of FIG. 3: Installation Condition Input Process)

The installation condition input unit 22 accepts input of an installation condition for an intrusion detection system.

Specifically, the installation condition for an intrusion detection system is created by the user. The installation condition input unit 22 acquires the created installation condition. The installation condition input unit 22 writes the acquired installation condition in the storage device 12.

Specific examples of the installation condition include a condition that "no intrusion detection system on a device (host-based IDS, HIDS) is to be installed" and a condition that "an intrusion detection system cannot be installed in a component having a constituent node number XX".

(Step S5 of FIG. 3: First Combination Reduction Process)

The combination reduction unit 28 extracts combinations that satisfy the installation condition accepted in step S4 from all the combinations identified in step S3. A combination that satisfies the installation condition is a combination that allows installation of an intrusion detection system when the installation condition is taken into account.

Specifically, the combination reduction unit 28 retrieves all the combinations identified in step S3 and the installation condition accepted in step S4 from the storage device 12. Out of all the retrieved combinations, the combination reduction unit 28 excludes combinations that do not satisfy the retrieved installation condition and extracts the remaining combinations. The combination reduction unit 28 thereby reduces the number of combinations. The combination reduction unit 28 writes the extracted combinations in the storage device 12.

As a specific example, when the installation condition is the condition that "no intrusion detection system on a device (host-based IDS, HIDS) is to be installed", the combination reduction unit 28 excludes all combinations including the constituent nodes having the constituent node numbers "1", "3", "4", "5", and "7", which are the constituent nodes that are devices, as combinations not satisfying the installation condition. Then, the combination reduction unit 28 extracts combinations not including the constituent node numbers "1", "3", "4", "5", and "7".

There are cases in which the user has some previous knowledge about locations that cannot be specified as installation locations of an intrusion detection system or locations not suitable as an installation place of an intrusion detection system, due to constraints related to a business operator or a device. When there are such constraints, the processes of steps S4 and S5 are performed in order to reduce the amount of processing of the installation location selection assistance apparatus 10, using those constraints as installation conditions. Therefore, when there are no such constraints, the processes of steps S4 and S5 are omitted.

(Step S6 of FIG. 3: Attack Information Input Process)

The attack information input unit 24 accepts input of attack information that defines an attack on the target system 50.

Specifically, security analysis is performed and the attack information is created by the user. The attack information input unit 24 acquires the created attack information. The attack information input unit 24 writes the acquired attack information in the storage device 12.

Figure 7:
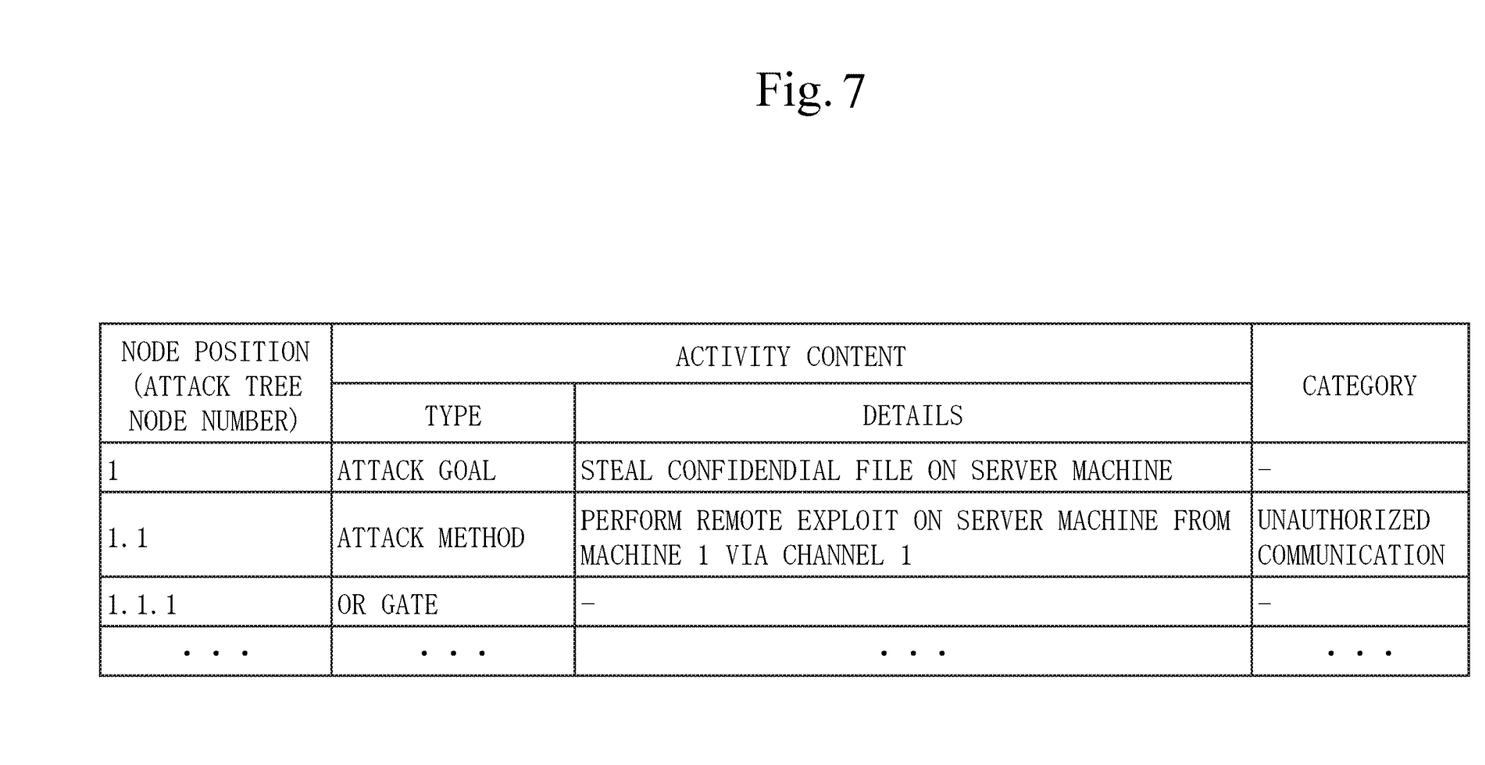
FIG. 7 is a diagram illustrating an example of an attack tree, which is attack information, according to the first embodiment.

In the first embodiment, the attack information is assumed to be an attack tree expressing the purpose and method of an attack in a tree structure. In the first embodiment, as illustrated in FIG. 7, the attack tree has a data structure indicating, for each node (hereinafter referred to as an attack node), a position of the attack node in the attack tree, activity content, and a category. The activity content includes a type and details. The method for describing the attack tree is not limited to the method illustrated in FIG. 7, and the attack tree may be described using Extensible Markup Language (XML) data.

It is assumed here that the attack tree includes at least one attack node whose category is "unauthorized communication". In the details of the attack node whose category is "unauthorized communication", a source and a destination of the unauthorized communication and a forwarding communication channel are indicated.

(Step S7 of FIG. 3: Detection Place Identification Process)

The detection place identification unit 29 identifies places where an unauthorized communication is to be detected based on the attack information accepted in step S6.

Specifically, the detection place identification unit 29 retrieves information on the details of the attack node whose category is "unauthorized communication" in the attack tree, which is the attack information accepted in step S6, from the storage device 12. The detection place identification unit 29 identifies the source and the destination of the unauthorized communication and the forwarding communication channel that are indicated by the retrieved information on the details of the attack node. Note here that by installing an intrusion detection system in any one of a source, a destination, and a communication channel that are identified from a certain attack node, it is possible to detect an unauthorized communication, which is an attack indicated by that attack node. Thus, the detection place identification unit 29 treats a source, a destination, and a communication channel that are identified from a certain attack node as places where an unauthorized communication, which is an attack indicated by that attack node, is to be detected. The detection place identification unit 29 writes the identified places where an unauthorized communication is to be detected in the storage device 12.

In the first embodiment, the detection place identification unit 29 expresses the places where an unauthorized communication is to be detected that are indicated by the attack node as a matrix.

Figure 8:
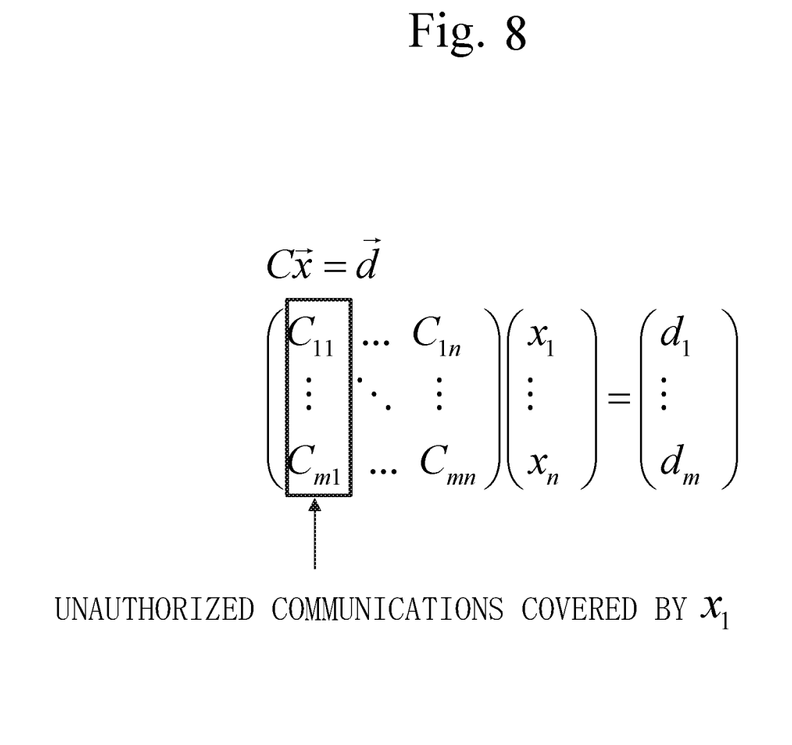
FIG. 8 is a diagram describing a method for calculating a coverage according to the first embodiment.

Specifically, this is expressed like a cover matrix C illustrated in FIG. 8. It is assumed here that the attack information indicates an unauthorized communication $a_i$ for each integer i of i=1, ..., m, as an attack whose category is "unauthorized communication". It is also assumed that the target system 50 includes a component $b_j$ for each integer j of j=1, ..., n. The detection place identification unit 29 generates the cover matrix C by setting 1 in an element $c_{ij}$ at row i and column j if the unauthorized communication $a_i$ is detectable and setting 0 in the element $c_{ij}$ at row i and column j if the unauthorized communication $a_i$ is not detectable when an intrusion detection system is installed in the component $b_j$. The detection place identification unit 29 writes the generated cover matrix C in the storage device 12.

In the cover matrix C, the elements in column j is information about the component $b_j$. That is, an unauthorized communication indicated by a row in which the element in column j is 1 is an unauthorized communication detectable by installing an intrusion detection system in the component $b_j$.

(Step S8 of FIG. 3: Coverage Calculation Process)

The coverage calculation unit 30 uses each combination extracted in step S5 as a target combination, and calculates a coverage, which is a rate of unauthorized communications detectable by the target combination, based on the places where an unauthorized communication is to be detected that are identified in step S8.

Specifically, in an installation column vector x illustrated in FIG. 8, the coverage calculation unit 30 sets 1 in an element $x_j$ in row j of the component $b_j$ included in the target combination and sets 0 in other elements $x_j$. The coverage calculation unit 30 calculates the product of the cover matrix C and the installation column vector x, so as to calculate a cover column vector d having elements $d_j$ of j=1, ..., m. The coverage calculation unit 30 divides the number of elements $d_j$ having a non-zero value in the cover column vector d by a value m, so as to calculate a rate of unauthorized communications detectable by the target combination.

Figure 9:
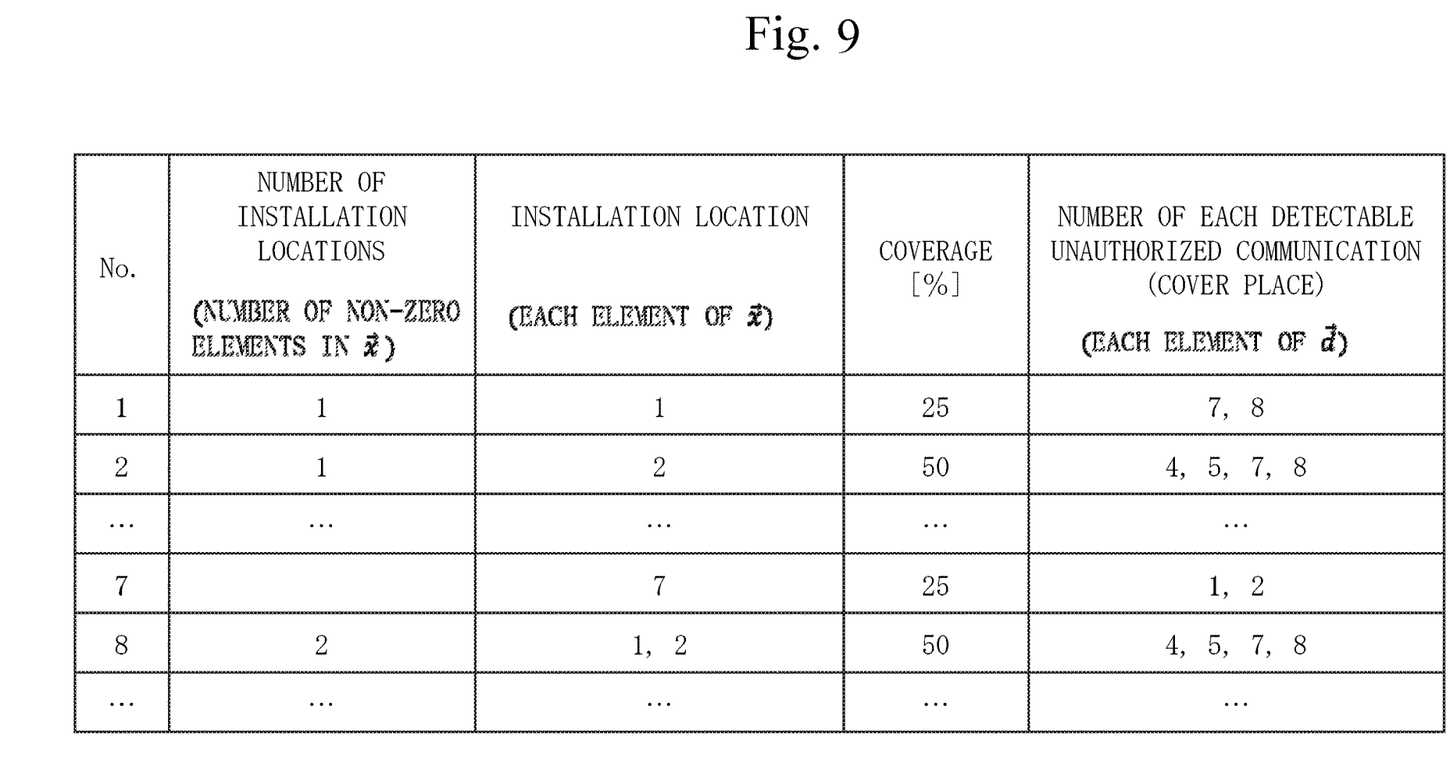
FIG. 9 is a diagram illustrating an example of results of calculating coverages according to the first embodiment.

As a result, a coverage and a number of each detectable unauthorized communication are obtained for each combination extracted in step S5, as illustrated in FIG. 9. A number of each unauthorized communication denotes an index i of the unauthorized communication $a_i$.

(Step S9 of FIG. 3: Threshold Input Process)

The threshold input unit 23 accepts input of a threshold for the coverage.

Specifically, the threshold is set by the user. The threshold input unit 23 acquires the set threshold. The threshold input unit 23 writes the acquired threshold in the storage device 12.

When the threshold is fixed to 100%, the process of step S9 is omitted.

(Step S10 of FIG. 3: Second Combination Reduction Process)

The combination reduction unit 28 extracts, from the combinations extracted in step S5, combinations that can detect unauthorized communications at a rate higher than or equal to the threshold accepted in step S9.

Specifically, the combination reduction unit 28 retrieves the threshold accepted in step S9 from the storage device 12. The combination reduction unit 28 refers to the coverage of each combination calculated in step S8, excludes combinations whose coverage is lower than the threshold, and extracts the remaining combinations. The combination reduction unit 28 thereby reduces the number of combinations. The combination reduction unit 28 writes the extracted combinations in the storage device 12.

(Step S11 of FIG. 3: Parameter Input Process)

The parameter input unit 25 accepts input of a parameter for determining an installation location of an intrusion detection system.

Specifically, the parameter is input to the parameter input unit 25 by the user. The parameter input unit 25 acquires the input parameter. The parameter input unit 25 writes the acquired parameter in the storage device 12.

Figure 10:
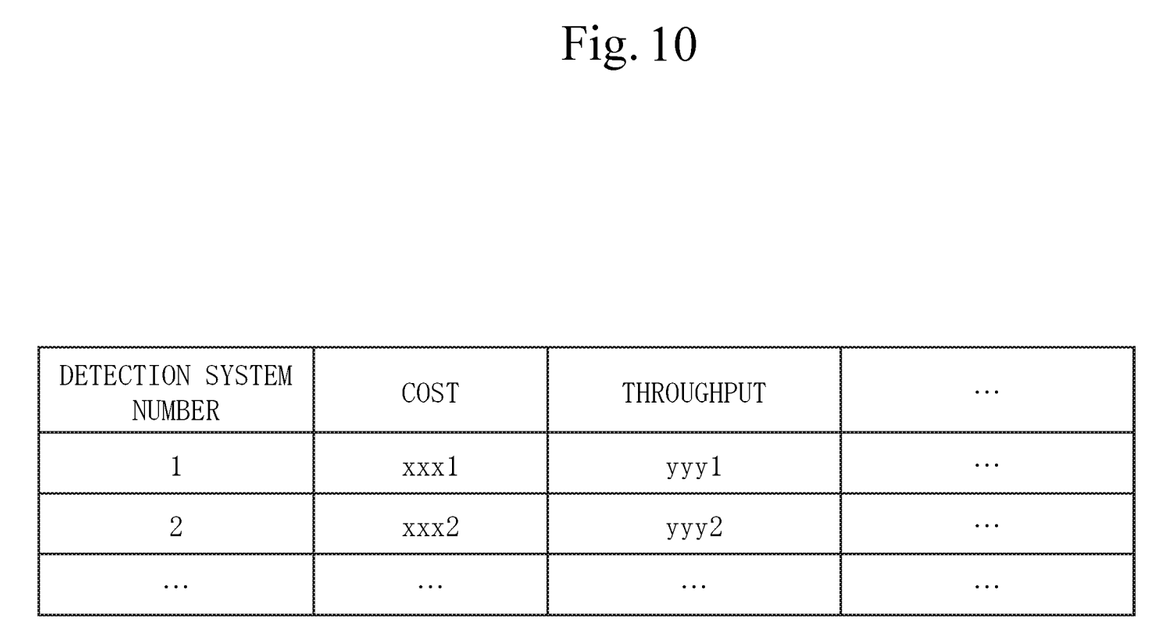
FIG. 10 is a diagram illustrating information stored in a product information storage unit 34 according to the first embodiment.

Specific examples of the parameter include the maximum number of intrusion detection systems to be installed, the maximum cost associated with installation of intrusion detection systems, and the minimum value of a margin in the amount of processing of an intrusion detection system to be installed. It is assumed that attribute values such as the cost and throughput of each intrusion detection system to be installed are stored in the product information storage unit 34 in advance, as illustrated in FIG. 10.

(Step S12 of FIG. 3: Objective Function Generation Process)

The objective function generation unit 31 retrieves the parameter accepted in step S11 from the storage device 12 and retrieves the attribute values stored in the product information storage unit 34. The objective function generation unit 31 generates an objective function for determining one of the combinations extracted in step S10, based on the retrieved parameter and attribute values.

Figure 11:
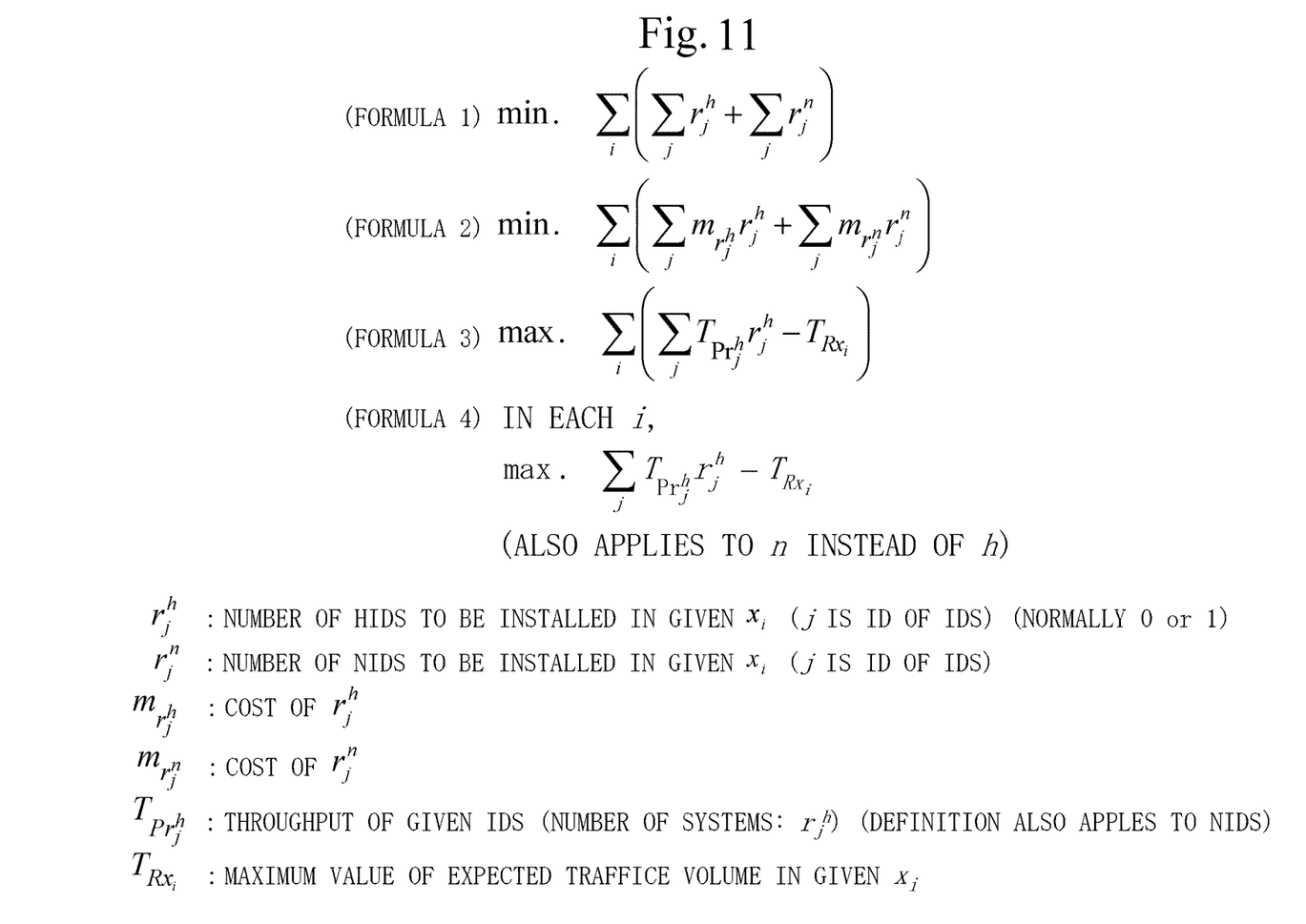
FIG. 11 is a diagram illustrating examples of an objective function according to the first embodiment.

A specific example is an objective function for reducing the number of intrusion detection systems to be installed, as indicated in Formula 1 of FIG. 11. Another specific example is an objective function for reducing the cost associated with installation of intrusion detection systems, as indicated in Formula 2 of FIG. 11. Another specific example is an objective function for increasing a margin in the amount of processing obtained by subtracting the maximum value of traffic from throughput, as indicated in Formula 3 of FIG. 11. In Formula 3 of FIG. 11, the sum of i is calculated. However, as indicated in Formula 4 of FIG. 11, an objective function for increasing a margin in the amount of processing for each i may also be considered.

In the Formulas illustrated in FIG. 11, the sum of i denotes the sum of non-zero elements $x_j$ in the installation column vector x illustrated in FIG. 8. In FIG. 11, NIDS is an abbreviation for Network Based IDS. In FIG. 11, an index $b_j$ indicates that it is related to HIDS, and an index n indicates that it is related to NIDS.

(Step S13 of FIG. 3: Objective Function Calculation Process)

The objective function calculation unit 32 solves the objective function generated in step S12 using existing solutions, such as the weighted average method and the constraint method, or using a solver. The objective function calculation unit 32 thereby identifies one combination from the combinations extracted in step S10 and identifies a specific intrusion detection system to be installed in each node included in the combination.

(Step S14 of FIG. 3: Output Process)

The output unit 33 outputs the combination identified in step S13 to the display device.

Specifically, the nodes included in the combination identified in step S13 and the specific intrusion detection system to be installed in each node are output to the display device.

Effects of First Embodiment

As described above, the installation location selection assistance apparatus 10 according to the first embodiment identifies combinations of components in each of which an intrusion detection system can be installed, and extracts combinations that can detect an unauthorized communication. This limits locations where an intrusion detection system is to be installed. Therefore, selection of a location where an intrusion detection system is to be installed is facilitated.

That is, conventionally, an installation location of an intrusion detection system is manually determined, taking into consideration the purpose of installation, the number of observers, IDS specifications, data flows (volumes and directions), a budget, and the like. This work involves a high workload when the scale of a system is large and there are a large number of threats. By introducing the installation location selection assistance apparatus 10 according to the first embodiment, this workload can be reduced.

The installation location selection assistance apparatus 10 according to the first embodiment extracts combinations with which a rate of detectable unauthorized communications out of unauthorized communications indicated by the attack information is higher than or equal to the threshold. This further limits locations where an intrusion detection system is to be installed. Therefore, selection of a location where an intrusion detection system is to be installed is further facilitated.

The installation location selection assistance apparatus 10 according to the first embodiment extracts combinations that satisfy an installation condition. This further limits locations where an intrusion detection system is to be installed. Therefore, selection of a location where an intrusion detection system is to be installed is further facilitated.

The installation location selection assistance apparatus 10 according to the first embodiment identifies a combination suitable for a purpose by calculating an objective function. This facilitates selection of an installation location suitable for the purpose.

Other Configurations

<First Variation>

In the first embodiment, the functional components are realized by software. As a first variation, however, the functional components may be realized by hardware. Regarding this first variation, differences from the first embodiment will be described.

Figure 12:
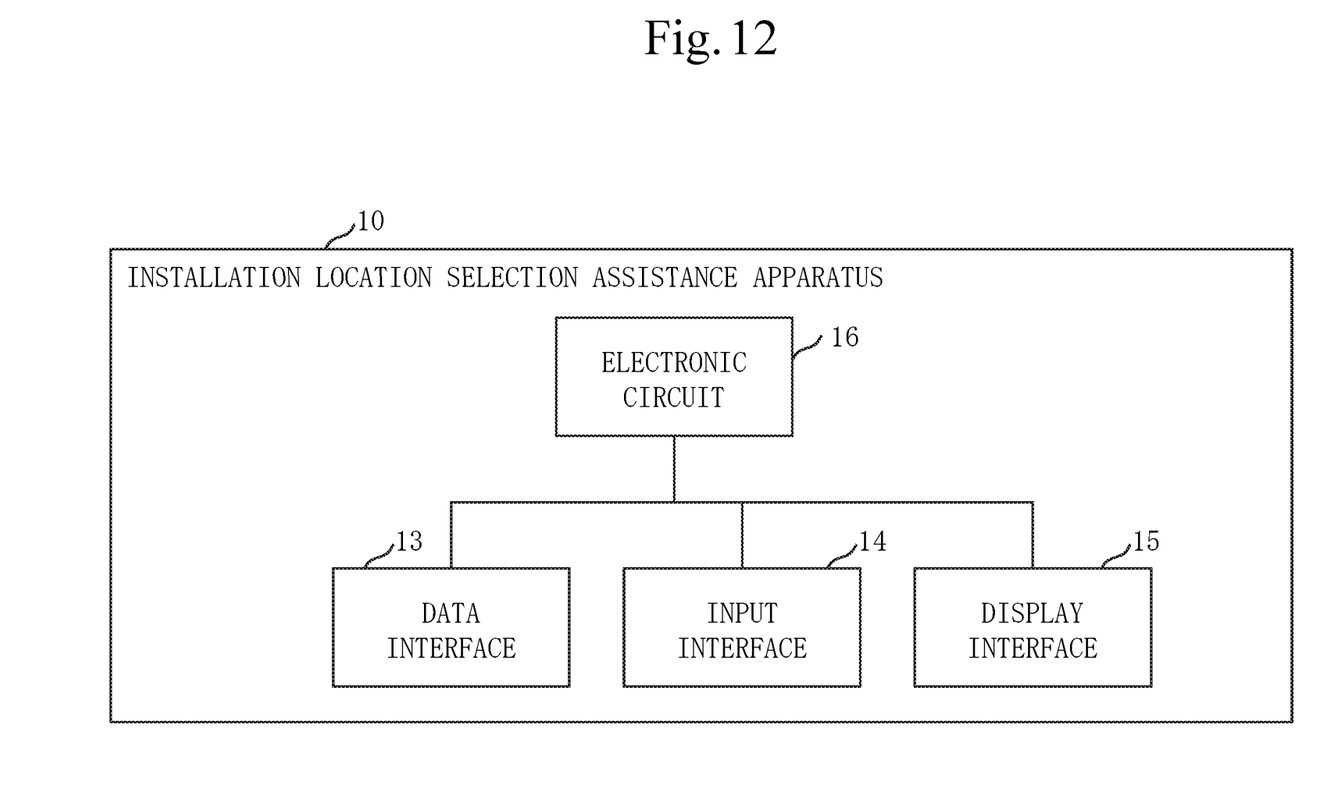
FIG. 12 is a configuration diagram of the installation location selection assistance apparatus 10 according to a first variation.

Referring to FIG. 12, a hardware configuration of the installation location selection assistance apparatus 10 according to the first variation will be described.

When the functional components are realized by hardware, the installation location selection assistance apparatus 10 includes an electronic circuit 16 in place of the processor 11 and the storage device 12. The electronic circuit 16 is a dedicated circuit that realizes the functions of the installation location identification unit 26, the combination identification unit 27, the combination reduction unit 28, the detection place identification unit 29, the coverage calculation unit 30, the objective function generation unit 31, the objective function calculation unit 32, the product information storage unit 34, and the storage device 12.

The electronic circuit 16 is assumed to be a single circuit, a composite circuit, a programmed processor, a parallel-programmed processor, a logic IC, a gate array (GA), an application specific integrated circuit (ASIC), or a field-programmable gate array (FPGA).

The functional components may be realized by one electronic circuit 16, or the functional components may be distributed among and realized by a plurality of electronic circuits 16.

<Second Variation>

As a second variation, some of the functional components may be realized by hardware, and the rest of the functional components may be realized by software.

Each of the processor 11, the storage device 12, and the electronic circuit 16 is referred to as processing circuitry. That is, the functional components are realized by the processing circuitry.

REFERENCE SIGNS LIST

10: installation location selection assistance apparatus, 11: processor, 12: storage device, 13: data interface, 14: input interface, 15: display interface, 16: electronic circuit, 21: system configuration input unit, 22: installation condition input unit, 23: threshold input unit, 24: attack information input unit, 25: parameter input unit, 26: installation location identification unit, 27: combination identification unit, 28: combination reduction unit, 29: detection place identification unit, 30: coverage calculation unit, 31: objective function generation unit, 32: objective function calculation unit, 33: output unit, 34: product information storage unit, 50: target system, 51: server, 52: computer, 53: guest terminal

The invention claimed is:

1. An installation location selection assistance apparatus comprising:
processing circuitry to:
identify combinations of one or more components which constitute a target system, in which an intrusion detection system that detects unauthorized access can be installed in the one or more components, and
extract, from the identified combinations, a combination with which a rate of detectable unauthorized communications out of unauthorized communications indicated by attack information is higher than or equal to a threshold.

2. The installation location selection assistance apparatus according to claim 1,
wherein the attack information indicates an unauthorized communication $a_i$ for each integer i of i=1, ..., m,
wherein the target system includes a component $b_j$ for each integer j of j=1, ..., n, and
wherein the processing circuitry calculates a product of a matrix C and a column vector x, the matrix C being a matrix in which 1 is set in an element $c_{ij}$ at row i and column j when the unauthorized communication $a_i$ is detectable and 0 is set in the element $c_{ij}$ when the unauthorized communication $a_i$ is not detectable, when the intrusion detection system is installed in the component $b_j$, the column vector x being a vector in which 1 is set in an element $x_j$ in row j of the component $b_j$ included in a target combination and 0 is set in other elements, so as to calculate a column vector d having elements $d_j$ of j=1, ..., m, and divides the number of elements $d_j$ having a non-zero value by a value of the integer m, so as to calculate a rate of unauthorized communications detectable by the target combination, and
extracts a combination that can detect unauthorized communications at a rate higher than or equal to the threshold, based on the calculated rate.

3. An installation location selection assistance apparatus comprising:
processing circuitry to:
identify combinations of one or more components which constitute a target system, in which an intrusion detection system that detects unauthorized access can be installed in the one or more components, accept input of an installation condition for the intrusion detection system, and extract, from the identified combinations, a combination that can detect an unauthorized communication in the one or more components indicated by attack information from an attack tree, and satisfies the accepted installation condition.

4. An installation location selection assistance apparatus comprising:

processing circuitry to:

identify combinations of one or more components which constitute a target system, in which an intrusion detection system that detects unauthorized access can be installed in the one or more components, extract, from the identified combinations, a combination that can detect an unauthorized communication in the one or more components indicated by attack information from an attack tree, and identify a recommended combination by solving an objective function for determining one of extracted combinations.

5. The installation location selection assistance apparatus according to claim 4, wherein the objective function is set based on at least one of a number of intrusion detection systems to be installed, a cost associated with installation of an intrusion detection system, and a processing margin of an intrusion detection system to be installed.

6. An installation location selection assistance method comprising:

identifying combinations of one or more components which constitute a target system, in which an intrusion detection system that detects unauthorized access can be installed in the one or more components; and extracting, from the identified combinations, a combination with which a rate of detectable unauthorized communications out of unauthorized communications indicated by attack information is higher than or equal to a threshold.

7. A non-transitory computer readable medium storing an installation location selection assistance program for causing a computer to execute:

a combination identification process of identifying combinations of one or more components which constitute a target system, in which an intrusion detection system that detects unauthorized access can be installed in the one or more components; and a combination reduction process of extracting, from the combinations identified by the combination identification process, a combination with which a rate of detectable unauthorized communications out of unauthorized communications indicated by attack information is higher than or equal to a threshold.

8. An installation location selection assistance method comprising:

identifying combinations of one or more components which constitute a target system, in which an intrusion detection system that detects unauthorized access can be installed in the one or more components;

accepting input of an installation condition for the intrusion detection system; and extracting, from the identified combinations, a combination that can detect an unauthorized communication in the one or more components indicated by attack information from an attack tree, and satisfies the installation condition.

9. A non-transitory computer readable medium storing an installation location selection assistance program for causing a computer to execute:

a combination identification process of identifying combinations of one or more components which constitute a target system, in which an intrusion detection system that detects unauthorized access can be installed in the one or more components;

an installation condition input process of accepting input of an installation condition for the intrusion detection system; and a combination reduction process of extracting, from the combinations identified by the combination identification process, a combination that can detect an unauthorized communication in the one or more components indicated by attack information from an attack tree and satisfies the installation condition accepted by the installation condition input process.

10. An installation location selection assistance method comprising:

identifying combinations of one or more components which constitute a target system, in which an intrusion detection system that detects unauthorized access can be installed in the one or more components;

extracting, from the identified combinations, a combination that can detect an unauthorized communication in the one or more components indicated by attack information from an attack tree; and identifying a recommended combination by solving an objective function for determining one of extracted combinations.

11. A non-transitory computer readable medium storing an installation location selection assistance program for causing a computer to execute:

a combination identification process of identifying combinations of one or more components which constitute a target system, in which an intrusion detection system that detects unauthorized access can be installed in the one or more components;

a combination reduction process of extracting, from the combinations identified by the combination identification process, a combination that can detect an unauthorized communication in the one or more components indicated by attack information from an attack tree; and a function calculation process of identifying a recommended combination by solving an objective function for determining one of combinations that are extracted by the combination reduction process.

* * * * *